United States Patent [19]
Martin

[11] Patent Number: 4,633,716
[45] Date of Patent: Jan. 6, 1987

[54] SHAKER HEAD EXPANDER

[76] Inventor: Robert W. Martin, 136 S. 8th Ave., #1, Industry, Calif. 91746

[21] Appl. No.: 727,907

[22] Filed: Apr. 26, 1985

[51] Int. Cl.[4] ............................................ G01N 29/04
[52] U.S. Cl. ........................................................ 73/663
[58] Field of Search ...................... 73/663, 665, 666, 668

[56] References Cited

U.S. PATENT DOCUMENTS

| | | | |
|---|---|---|---|
| 3,123,728 | 3/1964 | Kreiskorte | 73/666 |
| 3,646,807 | 3/1972 | Gray et al. | 73/665 |
| 3,699,807 | 10/1972 | Kerley et al. | 73/665 |
| 4,428,238 | 1/1984 | Tauscher | 73/663 |

*Primary Examiner*—Anthony V. Ciarlante
*Attorney, Agent, or Firm*—Boniard I. Brown

[57] ABSTRACT

A structure to provide increased surface area on the head of a shaker used for vibrational testing. The structure includes a base plate for attachment to the head of the shaker and a larger expanded head connected thereto by a frustoconical structure surrounding a cylindrical structure surrounding a spoke structure, all designed to increase the vibrational frequency at which undesired vibratory modes appear in the surface of the expanded head which otherwise can provide nonuniform vibration loading to the items attached thereto during testing. The structure also includes improved means for attachment to the shaker.

20 Claims, 13 Drawing Figures

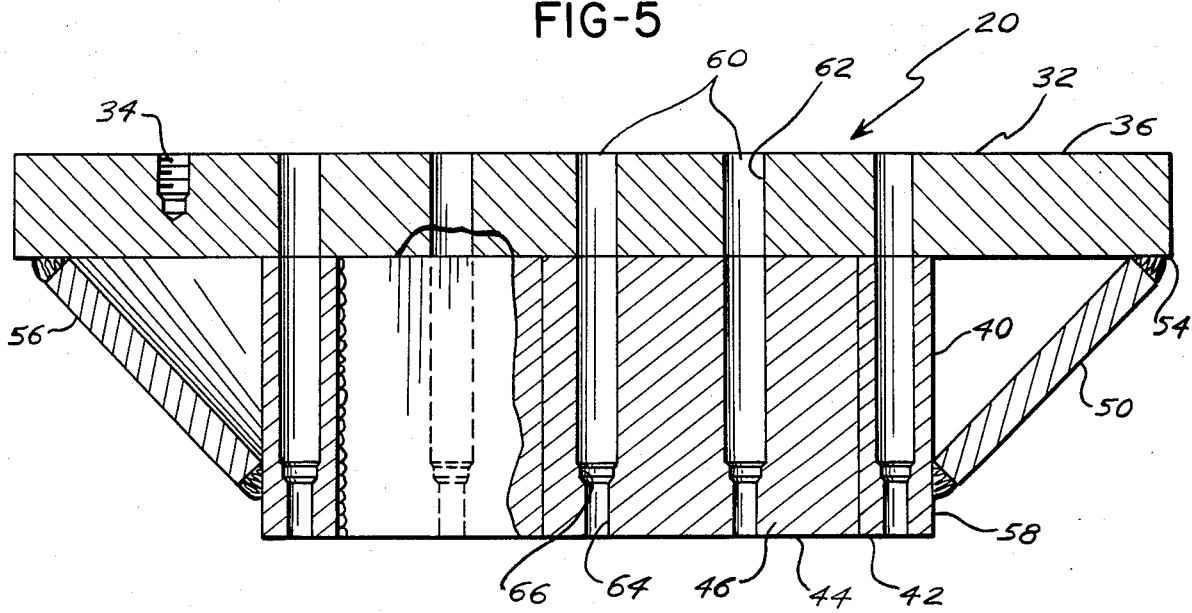
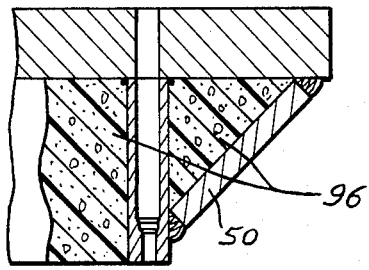
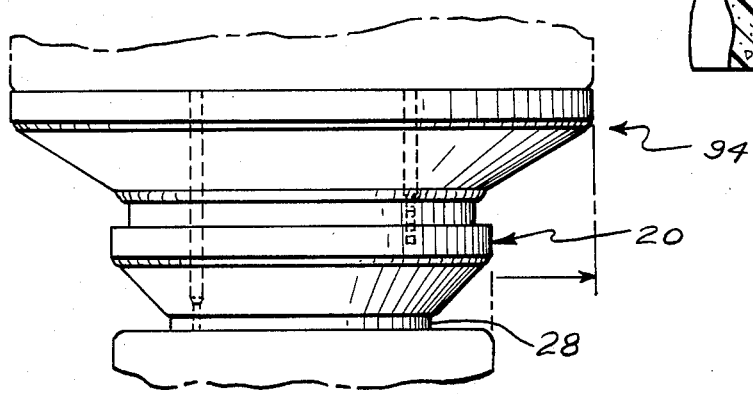
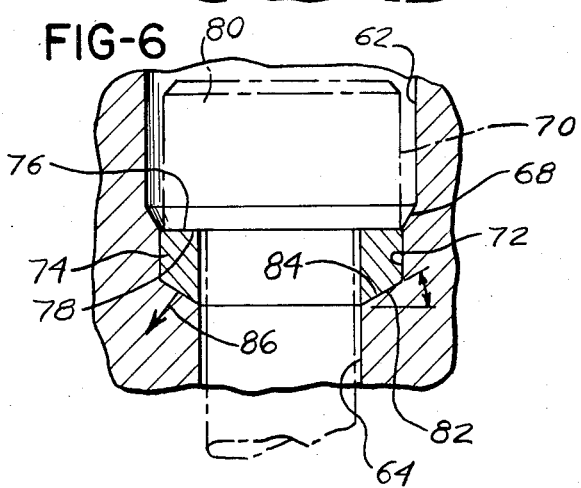

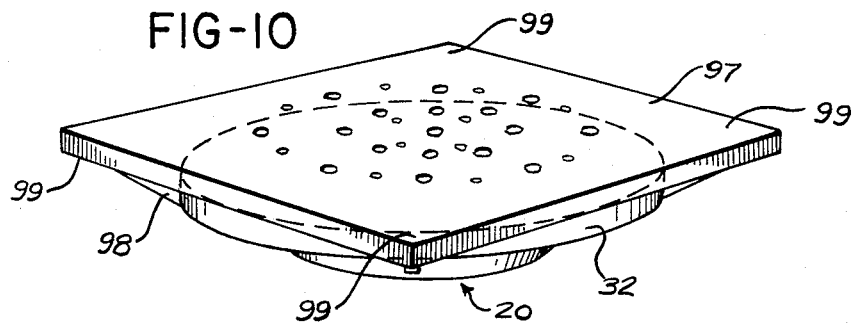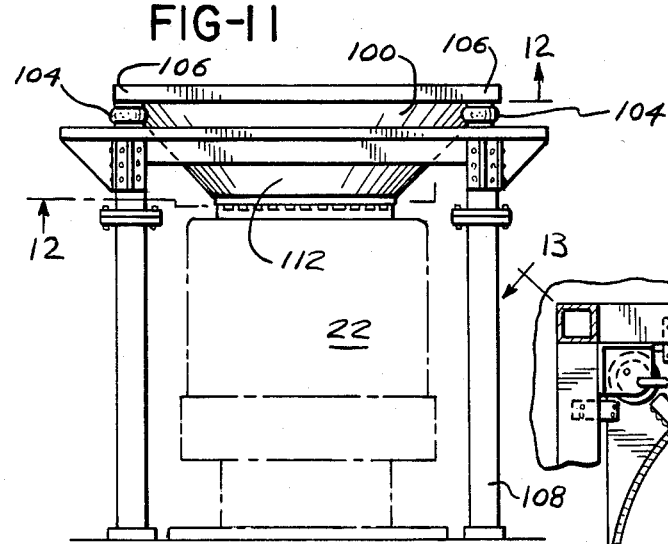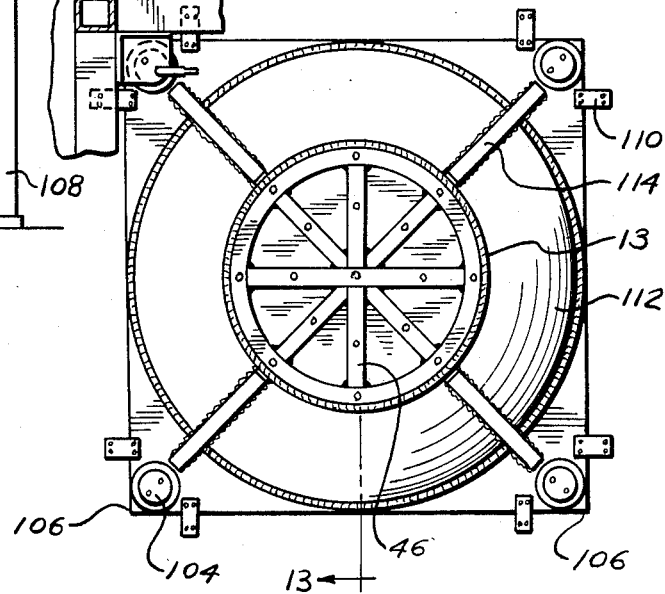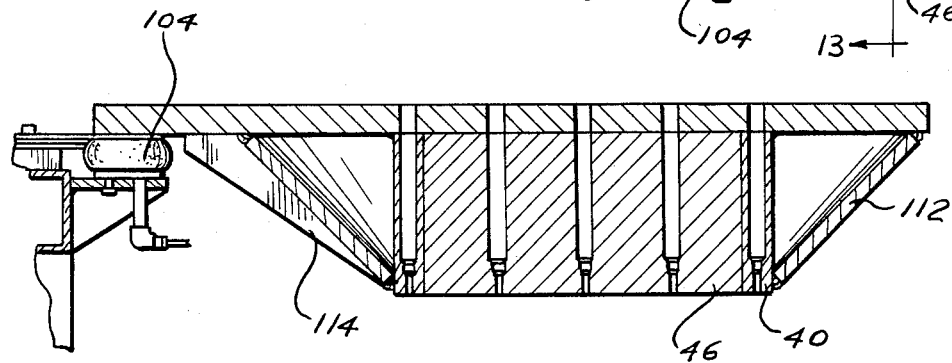

SHAKER HEAD EXPANDER

BACKGROUND OF THE INVENTION

Head expanders have been used with vibrational testing equipment such as shakers to substantially increase the table or plate area to which test specimens can be attached. Head expanders are desirable when the mass of the items being tested combined with the mass of the head expander is not sufficient to strain an existing shaker but the volume of the items is such that they cannot be accommodated on the head originally provided with the shaker.

Head expanders are known which enlarge a 24 inch diameter head to 36 or 40 inches. Such heads are driven by an armature which would typically provide 40,000 pounds of force in an up and down shaking frequency of up to 2,000 cycles per second. Unfortunately, expander heads under the above-mentioned shaking conditions heretofore have tended to diaphragm so that standing waves appear in their surfaces at critical frequencies. An object at the crest of such a standing wave is subjected to much more shaking force than one located at a node. Thus, test specimens positioned at different diameters or portions of the table are not subjected to similar amplitudes or displacements. Such expanders must be constructed as lightly as possible so sufficient vibrational energy remains for the mass of the items to be tested. Therefore, rather than being solid, they are constructed with a relatively thin table plate supported to the shaker head by supporting ribs. In an attempt to reduce diaphragming, some prior art head expanders include damping material, typically solid plastic material, with foam thereabout between the ribs underneath the table plate. The object being that the plastic material damps the standing waves. However, such arrangements are not particularly effective due to the magnitude of energy that must be damped especially at the outer portions of the table.

BRIEF DESCRIPTION OF THE PRESENT INVENTION

In the present invention an expanded head plate is supported above the shaker head by the opposite ends of a cylinder whose diameter is slightly greater than half the effective diameter of the expanded head plate. The interior of the cylinder includes a plurality of spokes which extend across the cylinder from the expanded head plate down to form the base surface of the device with the lower end of the cylinder. A frustoconical support extends from the cylinder adjacent its lower end to adjacent the outer edge of the expanded head plate to provide support to the periphery of the plate. If extremely heavy items are to be tested, the plate can be extended squarely out beyond the frustoconical support and then vertically supported by air cushions and positionally retained by flexures.

The typical prior art device instead has radiating ribs extending to the circumferential periphery of the expanded head plate without support between the outer portions of the ribs so that there results a diaphragming mode at resonance with the center of the plate either standing still or having a maximum 10% transmissibility of the armature movement with 6 G's input. That is, the periphery of the head expander can be running at 6 G's while the inside or center is running at half a G or less. By using the cylinder, the spokes, and the frustoconical support, there results an 85% or more uniform load across the entire working surface of the present expanded head plate. The invention provides substantial rise or increase in resonant frequency because of its stiffer, more rigid construction without an increase in mass. For example, with a conventional or prior art device in a 36 inch size, there may be a diaphragming mode at between 950 and 1050 Hertz. Under the same conditions, the present invention does not diaphragm until 1450 to 1520 Hertz. This is far higher and raises the diaphragming frequency above the frequency of the range of frequencies of most tests.

Utilizing prior art devices, specimens must be mounted equal distances from the center so that they all get the same input. The prior art devices cannot be mass loaded because the center would get no G's whereas 6 G's would appear at the periphery. In contrast, the present invention can be mass loaded, that is it can be loaded like a parking lot full of cars all across the table. Therefore, 3, 4 or 5 times as many specimens may be tested at one time in one testing operation. In some prior art devices filters are used to change the drive level of the shaker to correct for the resonance of the head so that the same effective loading is applied to an article in test even though the head may be diaphragming greatly. However, this requires expensive controls and filters which are not needed with the present invention which can be bolted on and operated.

Therefore it is an object of the present invention to provide an improved head expander for shakers and the like with greatly reduced vibrational discontinuities across its testing surface.

Another object is to provide a head expander for a shake table on which numerous items can be tested uniformly.

Another object is to provide a head expander which can be adapted to support large heavy loads.

Another object is to provide a head expander which has improved attachment means.

These and other objects and advantages of the present invention will become apparent to those skilled in the art after considering the following detailed specification together with the accompanying drawings wherein:

BRIEF DESCRIPTION OF THE DRAWINGS

FIG. 5 is an enlarged cross-sectional view taken on line 5—5 of FIG. 3;

FIG. 6 is an enlarged cross-sectional detail view of the attachment arrangement for the present invention;

FIG. 7 is a view similar to FIG. 6 of a prior art attachment arrangement including a common failure mode thereof;

FIG. 8 is a side, elevational view showing how head expanders constructed according to the present invention in different sizes can be stacked to provide even larger areas for test;

FIG. 9 is a partial cross-sectional view of a modified embodiment of the invention wherein damping material, typically solid plastic material with plastic foam thereabout, is utilized in an effort to have it absorb certain vibrations of the expanded head plate of the head expander;

FIG. 10 is a perspective view of a modified embodiment of the present invention adapted for heavy loads;

FIG. 11 is a side-elevational view of the head expander of FIG. 10 as installed on a shaker with side supports;

FIG. 12 is a bottom plan view taken at line 12—12 of FIG. 11; and

FIG. 13 is an enlarged, side cross-sectional view taken at line 13—13 in FIG. 12.

DETAILED DESCRIPTION OF THE SHOWN EMBODIMENTS

Figure 1:
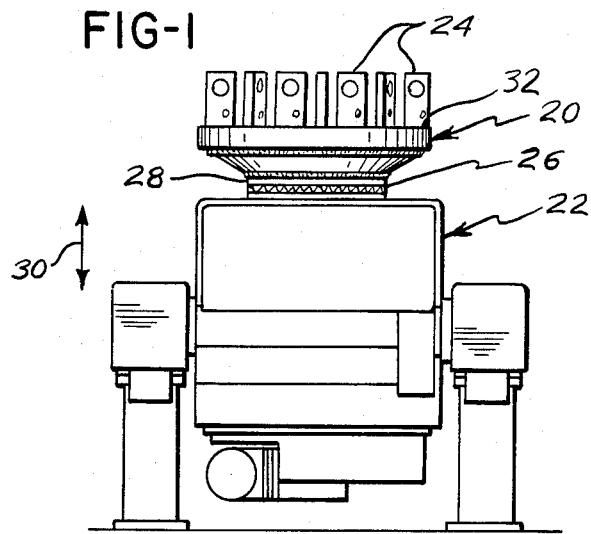
FIG. 1 is a side-elevational view showing a head expander constructed according to the present invention, mounted on a shaker with items thereon for testing.

Referring to the drawings more particularly by reference numbers, number 20 in FIG. 1 refers to a head expander constructed according to the present invention installed on a shaker 22 for subjecting test items 24 to the rigors of vibrational testing. Shakers 22 typically include an armature, the end 26 of which is provided with a table 28 to which items 24 to be tested can be attached. In many instances a shaker 22 is capable of providing vibrational energy in the direction of the arrow 30 with much greater acceleration than is required for the items to be tested. This normally occurs when the test items 24 have a relatively low mass to volume ratio. To use the full capability of the shaker 22, it is desirable to have a greater table area so that more items can be tested at the same time. Therefore, head expanders, which are structures which attach to the normal shake table 28 and expand the area thereof are common. Unfortunately, if such head expanders are to be effective, they must be light in weight so as to not overstress the shaker 22 and yet provide a uniform vibrational force to the items connected at any location on their expanded test area which in the case of head expander 20 is the table 32 a of larger diameter than the table 28.

Figure 2:
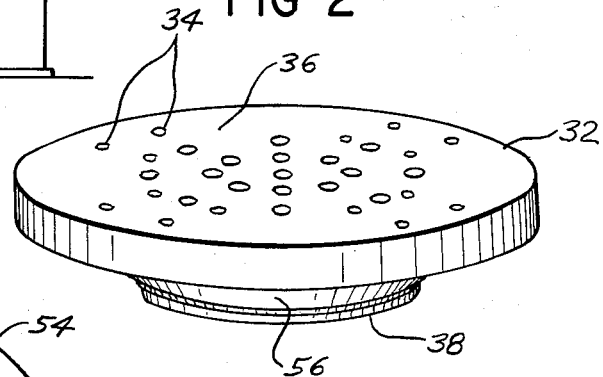
FIG. 2 is a perspective view of the present invention showing various mounting openings for specimens to be tested and attachment to another head.

Referring to FIG. 2 the table 32 includes a plurality of threaded test item hold down orifices 34 in its upper surface 36. The items 24 to be tested are positioned on the upper surface 36 and the orifices 34 are used to retain the items 24 during the shaking which occurs when the shaker 22 applies vibratory force through its connection with the bottom surface 38 of the head expander 20.

Figure 3:
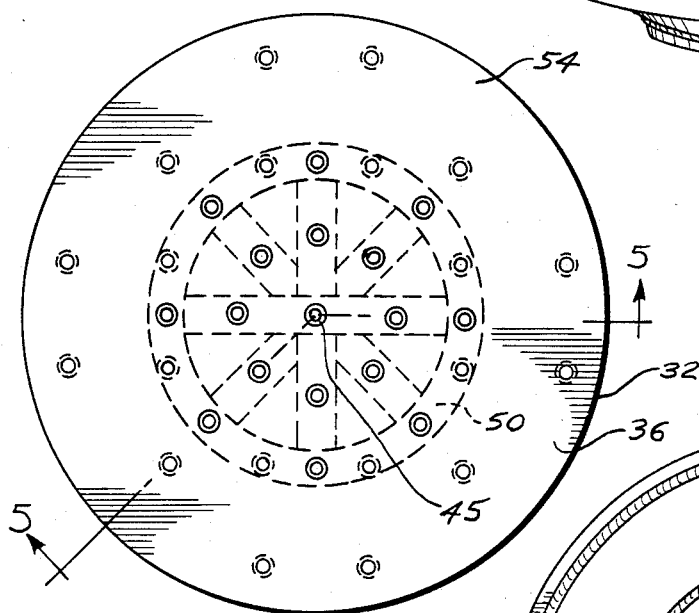
FIG. 3 is a top plan view showing structural features of the head expander of FIG. 1 and 2.
Figure 4:
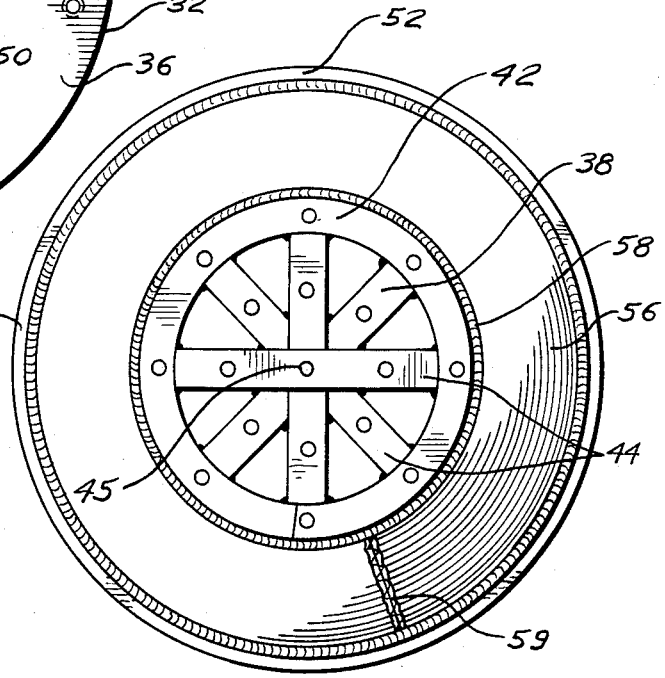
FIG. 4 is a bottom plan view of the head expander of FIG. 3.

The details of the construction of the present invention are shown in FIGS. 3 and 4. As can be seen, the table 32 is circular in shape and has a concentric cylinder 40 of just greater than half the diameter of the table 32 welded thereto. The bottom surface 42 above the cylinder 40 forms a portion of the undersurface 38 of the head expander 20. The remainder of the undersurface 38 is formed by the lower surfaces 44 of a plurality of vertical walls 46 arranged like spokes from a center 45 of the cylinder 40 and the table 32 within the cylinder 40 and welded thereto. The upper surfaces 48 of the walls 46 and the upper surface 50 of the cylinder 40 are welded to the underside 52 of the table 32 to form the direct support between the table 28 of the shaker 22 and the table 32. The peripheral edge 54 of the table 32 is supported by a hollow frustoconical member 56 securely attached to the outer surface 58 of the cylinder 40 adjacent its undersurface 38 and the peripheral edge 54 of the table 32. The member 56 may be a cast cone or the formed plate shown welded at seam 59. This structure consisting of cylinder 40, walls 46, and member 56, transmits vertical accelerations directly from the table 28 to the table 32 and supports the peripheral edge 54 of the table 32 so that it does not undesirably enter a diaphragming mode at frequencies of interest. Yet the expander 20 is relatively light so that it can be moved efficiently without overloading of the shaker 22, it normally being constructed from aluminum or other light weight material.

As seen in FIG. 5, the frustoconical member 56 preferably forms an angle of about 45° with both the outer surface 58 of the cylinder 40 and the underside 52 of the table 32 although this can vary from 20° to 70°. Also, as can be seen, the orifices 34 are threaded so that test items are easily bolted thereto. Other orifices 60 in the table 32 extend down through the cylinder 40 or the walls 46 for use in attaching the head expander 20 to an underlaying smaller table. Each orifice 60 is formed by an upper cylindrical surface 62, a lower cylindrical surface 64 of a slightly different diameter, and an attachment area 66 as shown in detail in FIG. 6 therebetween. The attachment area 66 includes a frustoconical surface 68 which acts as a relief for the cap screw 70 normally inserted therein. The frustoconical surface 68 therefore attaches the cylindrical surface 64 to a central cylindrical surface 72 which has a washer 74 retained therein. The washer 74 has an upper radial surface 76 on which the underside 78 of the screw head 80 applies force. The lower surface 82 of the washer 74 is frustoconical in shape to mate with a frustoconical surface 84 extending the cylindrical surface 72 to the cylindrical surface 64. Force applied to the washer 74 by means of the cap screw 70, wedges outward with an angle of 30° plus or minus 20° in the direction of the arrow 86. Prior art attachment means, such as shown in FIG. 7, use a washer 88 having a radial lower surface 90 so that applied forces tend to break off the shoulder 92, as shown.

The attachment means shown in FIGS. 6 and 7 can be used to attach the head expander 20 to the table 28. Thereafter a larger head expander 94 (FIG. 8) constructed in the same manner as head expander 20, can be attached to the table 32 thereof, still further increasing the available area when items 24 of extremely low mass to volume ratio, are to be vibrationally tested. It is also possible to insert dampening material 96 in the areas between the frustoconical member 56, the cylinder 40 and the walls 46 as shown in FIG. 9, if diaphragming is to be reduced to even lower levels.

As shown in FIG. 10, the head expander 20 can be modified by attaching a square head plate 97 to the table 32 for use in cases where heavy loads are expected. In that case, additional stiffening ribs 98 can be provided at the corners 99 thereof. It is also possible to build a head expander 100 as shown in FIGS. 11, 12, and 13, in which the table 102 of the head expander 100 is square in shape eliminating the need for the table 32. The expander 100 is shown supported by air cushion pillows 104 at its corners 106 above a supporting structure 108. The pillows 104 are used to remove the weight of the head expander 100 and any test item thereon from the armature of the shaker 22 so it can work more effectively while allowing the up-and-down shaking to occur. Massive objects under test even slightly off center, may put side loads on the shaker 22 and therefore the supporting structure 108 also includes flexures 110 connected at the corners 106 of the table 102 to prevent sideward motion of the head expander 100. The expander 100 as can be seen from FIGS. 12 and 13 otherwise is constructed essentially identically to head expander 20 having the cylinder 40, the plurality of walls 46 forming spokes within the cylinder 40 and a frustoconical edge support 112. The frustoconical edge support 112 is stiffened in four places by radially extending ribs 114 which extend from the cylinder 40 out to the corners 106 of the table 102 along the support 112.

Thus there have been shown and described novel head expanders for shakers which fulfill all of the objects and advantages sought therefore. Many changes, alterations, modifications and other uses and applications of the subject head expander will become apparent to those skilled in the art after considering this specification together with the accompanying drawings. All such changes, alterations and modifications which do not depart from the spirit and scope of the invention are deemed to be covered by the invention which is limited only by the claims which follow.

What is claimed is:

1. An expander structure for increasing the available test surface area of a vibrational tester including:
    a test plate having:
        a first surface with a predetermined effective diameter for supporting items to be vibrationally tested; and
        a second opposite surface;
    a cylinder having:
        a first end securely attached to said second opposite surface of said test plate;
        an inner cylindrical surface;
        an outer cylindrical surface; and
        a second end opposite from said first end, said second end having:
            a second end surface;
    a plurality of walls attached to said inner cylindrical surface of said cylinder, each having:
        a first surface securely attached to said second opposite surface of said test plate; and
        a second surface planar to said second end of said cylinder; and
    a frustoconical member connected between said outer cylindrical surface of said cylinder and said second opposite surface of said test plate.

2. The structure as defined in claim 1 wherein said cylinder has a diameter larger than one half said predetermined effective diameter of said test plate.

3. The structure as defined in claim 1 wherein said frustoconical member forms an angle with said test plate of about 45°.

4. The structure as defined in claim 1 wherein said plurality of walls are attached to said inner cylindrical surface of said cylinder in perpendicular relation thereto.

5. The structure as defined in claim 1 wherein said cylinder is concentric to said predetermined effective diameter of said test plate.

6. The structure as defined in claim 1 further including:
    attachment means to the vibrational tester, said attachment means include:
        a first small cylindrical surface extending through said test plate and a portion of said cylinder;
        a second small cylindrical surface extending through a portion of said cylinder coaxially with said first small cylindrical surface;
        a frustoconical surface between said first and second small cylindrical surfaces;
    a washer having:
        a radial surface; and
        a conical surface angled and sized to mate with said frustoconical surface between said first and second small cylindrical surfaces; and
    a bolt extending through said washer and said second small cylindrical surface positioned to apply force to said radial surface for transfer through said washer to said frustoconical surface between said first and second small cylindrical surfaces.

7. The structure as defined in claim 1 wherein said test plate includes:
    an outer periphery, said frustoconical member being connected between said outer cylindrical surface of said cylinder adjacent said second end thereof and said second opposite surface of said test plate adjacent said outer periphery thereof.

8. The structure defined in claim 7 wherein said outer periphery defines said predetermined effective diameter of said test plate.

9. The structure as defined in claim 1 wherein said test plate further includes:
    corners outside said predetermined effective diameter thereof, said structure further including:
    a support structure having:
        air cushion pillows positioned to support said test plate corners; and
        a plurality of flexures attached to said test plate corners to restrain movement of said test plate in a line perpendicular thereto.

10. The structure as defined in claim 9 further including:
    a rib extending from said outer cylindrical surface and said frustoconical member to each corner.

11. The structure as defined in claim 1 wherein said walls intersect at the center of said cylinder.

12. An expander structure for increasing the available test surface area of a vibrational tester including:
    a test plate having:
        a first surface for supporting items to be vibrationally tested; and
        a second opposite surface;
    a central support member having:
        a first end securely attached to said second opposite surface of said test plate;
        an inner surface;
        an outer surface; and
        a second end opposite from said first end, said second end having:
            a second end surface;
    a plurality of ribs attached to said inner surface of said central support member, each having:
        a first surface securely attached to said second opposite surface of said test plate; and
        a second surface planar to said second end of said central support member; and
    a frustoconical member connected between said outer surface of said central support member and said second opposite surface of said test plate.

13. The structure as defined in claim 12 wherein said frustoconical member forms an angle with said test plate of about 45°.

14. The structure as defined in claim 13 wherein said test plate includes:

an outer periphery, said frustoconical member being connected between said outer surface of said central support member adjacent said second end thereof and said second opposite surface of said test plate adjacent said outer periphery thereof.

15. The structure as defined in claim 14 wherein said walls intersect at the center of said test plate.

16. The structure as defined in claim 15 wherein said test plate further includes:
   corners outside said predetermined effective diameter thereof, said structure further including:
   a support structure having:
      air cushion pillows positioned to support said test plate corners: and
      a plurality of flexures attached to said test plate corners to restrain movement of said test plate in a line perpendicular thereto.

17. The structure as defined in claim 16 further including:
   a rib extending from said outer surface of said central support member and said frustoconical member to each corner.

18. The structure as defined in claim 17 wherein said central support member is a cylinder.

19. The structure as defined in claim 18 further including:
   attachment means to the vibrational tester, said attachment means including:
      a first small cylindrical surface extending through said test plate and a portion of said cylinder;
      a second small cylindrical surface extending through a portion of said cylinder coaxally with said first small cylindrical surface;
      a first frustoconical surface between said first and second small cylindrical surfaces;
      a first washer having:
         a radial surface; and
         a conical surface angled and sized to mate with said first frustoconical surface between said first and second small cylindrical surfaces; and
      a first bolt extending through said first washer and said second small cylindrical surface positioned to apply force to said radial surface of said first washer for transfer through said first washer to said first frustoconical surface between said first and second small cylindrical surfaces.

20. The structure as defined in claim 19 wherein said attachment means further including:
   a third small cylindrical surface extending through said test plate and a portion of one of said walls;
   a fourth small cylindrical surface extending through a portion of said one of said walls coaxially with said third small cylindrical surface;
   a second frustoconical surface between said third and fourth small cylindrical surfaces;
   a second washer having:
      a radial surface; and
      a conical surface angled and sized to mate with said second frustoconical surface between said third and fourth small cylindrical surfaces; and
   a second bolt extending through said second washer and said fourth small cylinder surface positioned to apply force to said radial surface of said second washer for transfer through said second washer to said second frustoconical surface between said third and fourth small cylindrical surfaces.

* * * * *